US008846242B2

(12) United States Patent
Byun et al.

(10) Patent No.: US 8,846,242 B2
(45) Date of Patent: Sep. 30, 2014

(54) RECHARGEABLE BATTERY

(71) Applicants: Samsung SDI Co., Ltd., Yongin-si (KR); Robert Bosch GmbH, Stuttgart (DE)

(72) Inventors: Sangwon Byun, Yongin-si (KR); Yongsam Kim, Yongin-si (KR); Sooseok Choi, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/085,709

(22) Filed: Nov. 20, 2013

(65) Prior Publication Data

US 2014/0079966 A1    Mar. 20, 2014

Related U.S. Application Data

(63) Continuation of application No. 12/817,115, filed on Jun. 16, 2010, now Pat. No. 8,617,737.

(30) Foreign Application Priority Data

Jan. 26, 2010    (KR) .................. 10-2010-0007049

(51) Int. Cl.
*H01M 2/26* (2006.01)
(52) U.S. Cl.
USPC ..................... 429/161; 429/163; 429/164
(58) Field of Classification Search
None
See application file for complete search history.

(56) References Cited

U.S. PATENT DOCUMENTS

| | | | |
|---|---|---|---|
| 4,879,187 A | 11/1989 | Biegger | |
| 5,158,842 A | 10/1992 | McHenry | |
| 5,604,051 A | 2/1997 | Pulley et al. | |
| 5,798,906 A | 8/1998 | Ando et al. | |
| 6,342,826 B1 | 1/2002 | Quinn et al. | |
| 6,858,343 B2 | 2/2005 | Wang | |
| 2003/0077484 A1 | 4/2003 | Cho | |
| 2004/0126650 A1 | 7/2004 | Kim | |
| 2006/0019158 A1 | 1/2006 | Mori et al. | |
| 2006/0019159 A1 | 1/2006 | Mori et al. | |
| 2007/0160904 A1 | 7/2007 | Uh | |
| 2009/0305126 A1 | 12/2009 | Choi et al. | |

(Continued)

FOREIGN PATENT DOCUMENTS

| | | | |
|---|---|---|---|
| EP | 0313405 A1 | 4/1989 | |
| EP | 1059687 A2 | 12/2000 | |

(Continued)

OTHER PUBLICATIONS

Patent Abstracts of Japan, and English machine translation of Japanese Publication 08-185850 A, (11 pages).

(Continued)

*Primary Examiner* — Cynthia K. Walls
(74) *Attorney, Agent, or Firm* — Christie, Parker & Hale, LLP

(57) ABSTRACT

A rechargeable battery includes an electrode assembly having a first electrode plate, a second electrode plate, and a separator between the first electrode plate and the second electrode plate; a first collecting plate electrically coupled to the first electrode plate, the first collecting plate including a fuse reinforcement part having a fuse opening and a reinforcement protrusion protruding from a periphery of the fuse opening; a case housing the electrode assembly and the first collecting plate; and a cap assembly coupled to the case and comprising a cap plate.

19 Claims, 6 Drawing Sheets

(56) References Cited

U.S. PATENT DOCUMENTS

| | | |
|---|---|---|
| 2010/0247989 A1 | 9/2010 | Kim |
| 2011/0244281 A1 | 10/2011 | Byun |
| 2011/0300419 A1 | 12/2011 | Byun |

FOREIGN PATENT DOCUMENTS

| | | |
|---|---|---|
| EP | 2 273 587 A1 | 1/2011 |
| EP | 2 287 942 A1 | 2/2011 |
| EP | 2 393 145 A1 | 12/2011 |
| EP | 2 403 036 A1 | 1/2012 |
| JP | 01-122560 A | 5/1989 |
| JP | 08-185850 A | 7/1996 |
| JP | 10-188946 A | 7/1998 |
| JP | 11-204006 A | 7/1999 |
| JP | 2001-084880 A | 3/2001 |
| JP | 2001-148239 | 5/2001 |
| JP | 2003-178745 A | 6/2003 |
| JP | 2003-187760 A | 7/2003 |
| JP | 2003-331815 A | 11/2003 |
| JP | 2004-119383 A | 4/2004 |
| JP | 2005-142026 A | 6/2005 |
| JP | 2005-259574 A | 9/2005 |
| JP | 2005-267945 A | 9/2005 |
| JP | 2007-188884 A | 7/2007 |
| JP | 2007-266000 A | 10/2007 |
| JP | 2008-218132 A | 9/2008 |
| JP | 2009-535777 | 10/2009 |
| KR | 10-0693115 B1 | 3/2007 |
| KR | 10-2010-0108854 | 10/2010 |

OTHER PUBLICATIONS

Patent Abstracts of Japan, and English machine translation of Japanese Publication 10-188946 A, (8 pages).
Patent Abstracts of Japan, and English Machine Translation of JP 11-204006 A, (8 pages).
Patent Abstracts of Japan, and English machine translation of Japanese Publication 2001-148239 A, (6 pages).
Patent Abstracts of Japan, and English machine translation of Japanese Publication 2003-187760 A, (8 pages).
Patent Abstracts of Japan, and English machine translation of Japanese Publication 2003-331815 A, (5 pages).
Patent Abstracts of Japan, and English machine translation of Japanese Publication 2005-142026 A, (15 pages).
Patent Abstracts of Japan, and English machine translation of Japanese Publication 2005-259574 A, (10 pages).
Patent Abstracts of Japan, and English Machine Translation of JP 2005-267945 A (12 pages).
Patent Abstracts of Japan, and English Machine Translation of JP 2007-266000 A, (12 pages).
Patent Abstracts of Japan, and English Machine Translation of JP 2008-218132 A, (9 pages).
Extended European Search Report dated Nov. 4, 2010 issued by the EPO for Korean Priority Patent Application No. 10171704.9, (5 pages).
European Search Report dated Aug. 1, 2011, for European Patent application 11158033.8, (7 pages).
EP Office action issued Apr. 16, 2012 for EP Application No. 10 171 704.9, (3 pages).
Japanese Office action dated Sep. 18, 2012, for corresponding Japanese Patent application 2010-154420, (2 pages).
JPO Office action dated Apr. 30, 2013, for corresponding Japanese Patent application 2011-116948, (2 pages).
KIPO Office action dated Jul. 24, 2012, for Korean Patent application 10-2011-0017597, (3 pages).
Korean Notice of Allowance dated May 4, 2011 issued by KIPO corresponding to Application No. KR 10-2010-0007049, (5 pages).
KIPO Notice of Allowance dated Jan. 15, 2013, for Korean Patent application 10-2011-0017597, (5 pages).
U.S. Office action dated Nov. 1, 2011, for cross reference U.S. Appl. No. 13/023,452, (13 pages).
U.S. Office action dated Sep. 7, 2012, for cross reference U.S. Appl. No. 13/023,452, (8 pages).
U.S. Office action dated Jan. 23, 2013, for cross reference U.S. Appl. No. 13/023,452, (10 pages).
U.S. Notice of Allowance dated Feb. 23, 2012, for cross reference U.S. Appl. No. 13/023,452, (9 pages).
U.S. Notice of Allowance dated Jul. 25, 2012, for cross reference U.S. Appl. No. 13/023,452, (10 pages).
U.S. Notice of Allowance dated Apr. 2, 2013, for cross reference U.S. Appl. No. 13/023,452, (11 pages).

── 1 ──

RECHARGEABLE BATTERY

CROSS-REFERENCE TO RELATED APPLICATION

This application is a continuation of U.S. patent application Ser. No. 12/817,115 filed Jun. 16, 2010 which claims priority to and the benefit of Korean Patent Application No. 10-2010-0007049, filed Jan. 26, 2010, in the Korean Intellectual Property Office, the disclosures of which are incorporated herein by reference.

BACKGROUND

1. Field

Embodiments relate to a rechargeable battery.

2. Description of the Related Art

Unlike a primary battery that is not rechargeable, a rechargeable battery is dischargeable and rechargeable. A low capacity battery having a battery cell packaged in the form of a pack is generally used for small, portable electronic devices such as a mobile phone or a camcorder. A large capacity battery having tens of battery packs interconnected is widely used as a power source for driving a motor of a hybrid vehicle and the like.

The rechargeable battery is formed in a variety of shapes such as a prismatic shape, a cylinder shape, and the like. The rechargeable battery typically includes an electrode assembly having positive and negative electrode plates and a separator between the positive and negative electrode plate, a case receiving the electrode assembly as well as electrolyte, and a cap assembly having electrode terminals and installed on the case.

Overcharging may excessively heat a rechargeable battery, or decomposition of electrolyte may increase an inner pressure of the rechargeable battery to cause a spark or explosion. Thus, a rechargeable battery having a structure for improving stability is desired.

SUMMARY

An aspect of the present invention provides a rechargeable battery that includes a collecting plate having a fuse reinforcement part functioning as a fuse and a reinforcement for the fuse, thereby improving stability.

According to at least one of embodiments, a rechargeable battery includes an electrode assembly comprising a first electrode plate, a second electrode plate, and a separator between the first electrode plate and the second electrode plate; a first collecting plate electrically coupled to the first electrode plate, the first collecting plate including a fuse reinforcement part having a fuse opening and a reinforcement protrusion protruding from a periphery of the fuse opening; a case housing the electrode assembly and the first collecting plate; and a cap assembly coupled to the case and comprising a cap plate.

In embodiments, the reinforcement protrusion protrudes toward the cap assembly or the case. Further, the first collecting plate may include a first connection part located between the electrode assembly and the cap assembly; and a first extension part extending at an angle from the first connection part and contacting a non-coating portion of the first electrode plate, wherein the fuse reinforcement part is on the first connection part or the first extension part.

In one embodiment, the fuse reinforcement part is located on the first connection part proximate an intersection of the first connection part and the first extension part or on the first extension part proximate an intersection of the first connection part and the first extension part.

Further, in one embodiment, a second collecting plate is electrically coupled to the second electrode plate, wherein the second collecting plate comprises a fuse reinforcement part having a fuse opening and a reinforcement protrusion protruding from a periphery of the fuse opening.

In one embodiment, the cap assembly includes a first electrode terminal passing through the cap plate and contacting the first collecting plate; and a second electrode terminal passing through the cap plate and contacting the second collecting plate, and the reinforcement protrusion of the first collecting plate and the reinforcement protrusion of the second collecting plate protrude toward the cap assembly or toward the case. Additionally, the first collecting plate may contact the cap plate, and the cap assembly may include an electrode terminal passing through the cap plate and contacting the second collecting plate.

In one embodiment, the cap assembly includes a convex reversible first short circuit plate accommodated in a short circuit opening on the cap plate; and a second short circuit plate electrically coupled to the second collecting plate on an exterior of the case, the second short circuit plate spaced from the cap plate and covering the short circuit hole.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1:
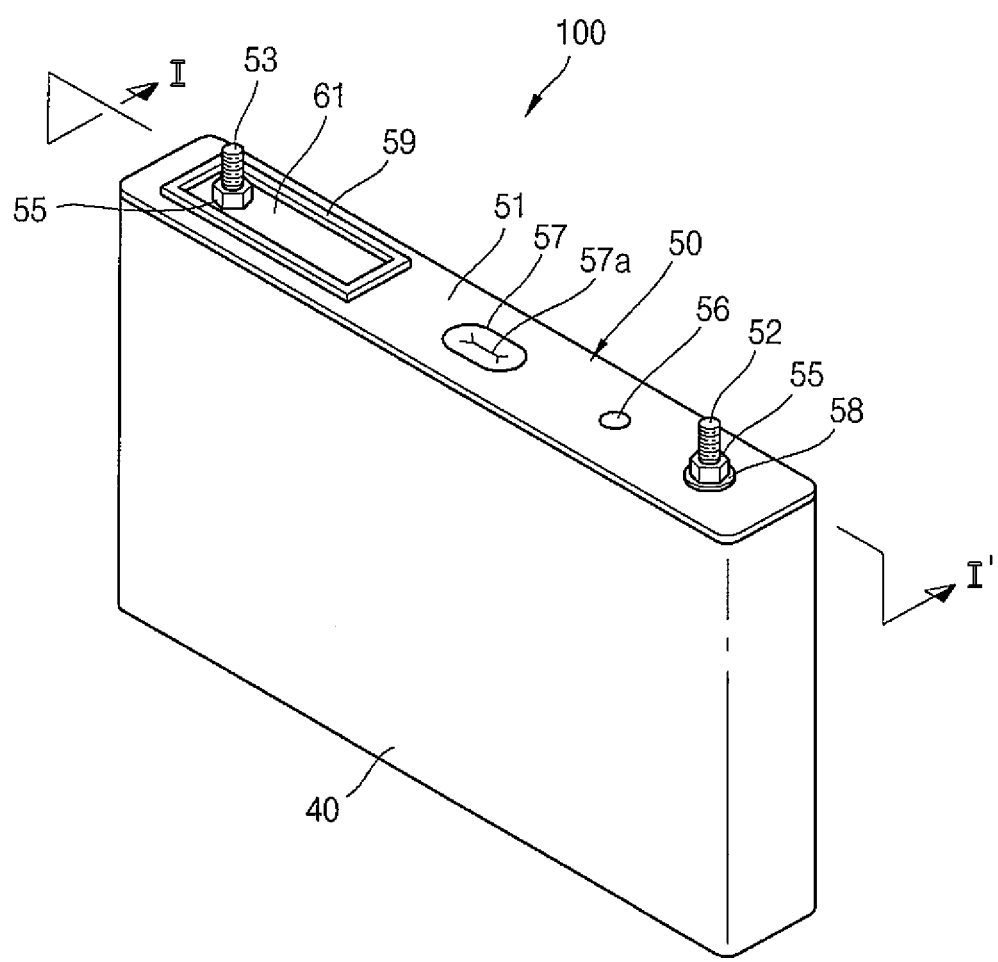
FIG. 1 is a perspective view illustrating a rechargeable battery according to an embodiment.
Figure 2:
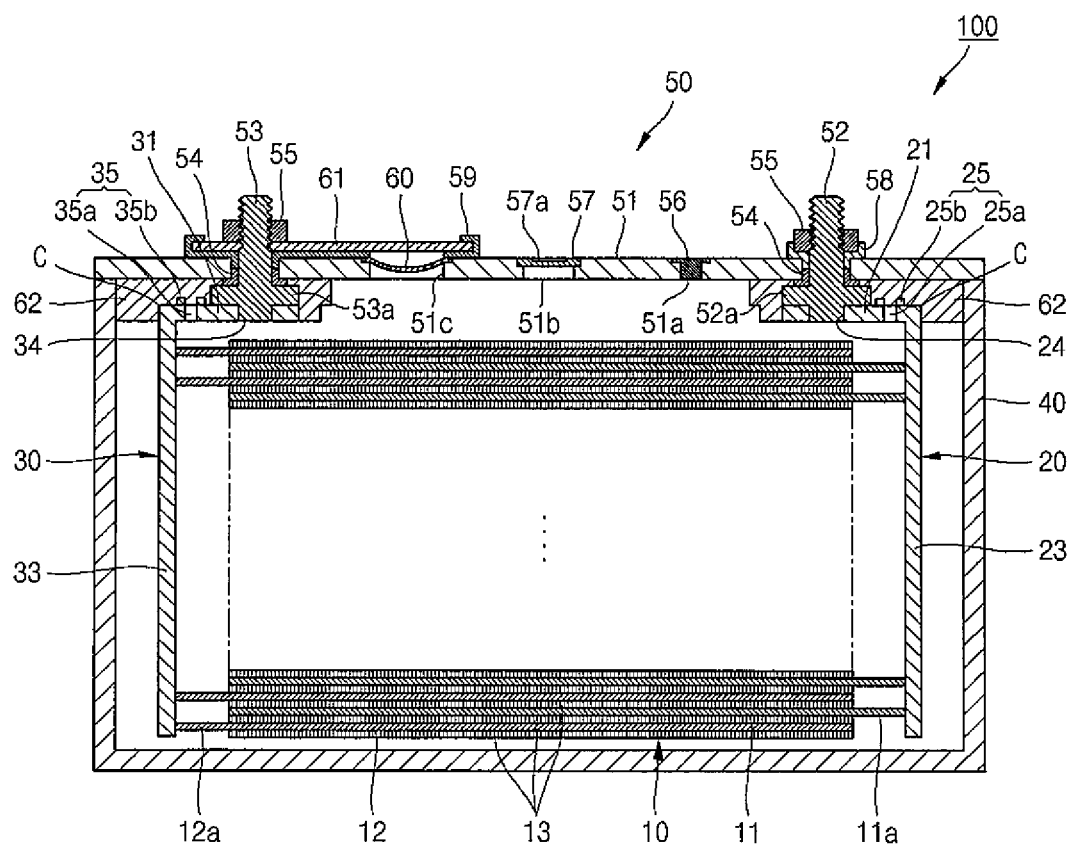
FIG. 2 is a cross-sectional view taken along line I-I' of FIG. 1.
Figure 3:
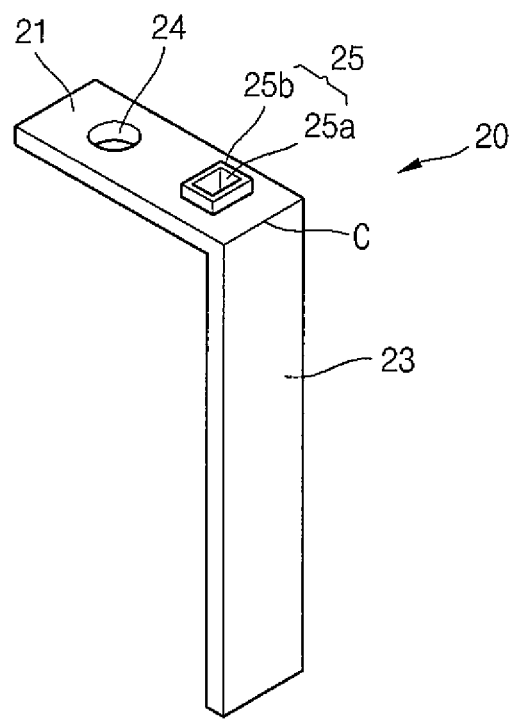
FIG. 3 is a perspective view illustrating a first collecting plate of FIG. 2.
Figure 4:
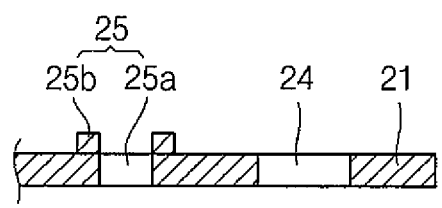
FIG. 4 is a partial cross-sectional view illustrating a portion of the first collecting plate of FIG. 3.
Figure 5:
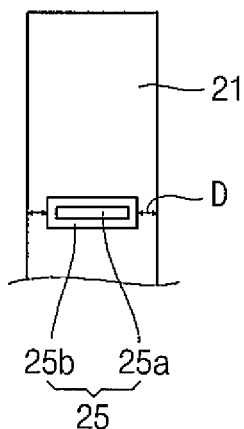
FIG. 5 is a partial plan view illustrating a portion of the first collecting plate of FIG. 3.

FIG. 1 is a perspective view illustrating a rechargeable battery according to an embodiment. FIG. 2 is a cross-sectional view taken along line I-I' of FIG. 1. FIG. 3 is a perspective view illustrating a first collecting plate of FIG. 2. FIG. 4 is a partial cross-sectional view illustrating a portion of the first collecting plate of FIG. 3. FIG. 5 is a partial plan view illustrating a portion of the first collecting plate of FIG. 3.

Referring to FIGS. 1 and 2, a rechargeable battery 100 according to the current embodiment includes an electrode assembly 10, a first collecting plate 20, a second collecting plate 30, a case 40, and a cap assembly 50.

The electrode assembly 10 is formed by winding or stacking a first electrode plate 11, a separator 13, and a second electrode plate 12, which have thin plate shapes or film shapes. The first electrode plate 11 may function as a positive electrode, and the second electrode plate 12 may function as a negative electrode.

The first electrode plate 11 is formed by applying first electrode active materials such as transition metal oxide on a first electrode collector formed of metal foil such as aluminum foil, and includes first electrode non-coating portions 11a on which the first electrode active materials are not applied. The first electrode non-coating portions 11a function as passages for current flow between the first electrode plate 11 and the outside of the first electrode plate 11. The material of the first electrode plate 11 is not limited to those disclosed by the present disclosure.

The second electrode plate 12 is formed by applying second electrode active materials such as graphite or carbon on a second electrode collector formed of metal foil such as nickel or copper foil, and includes second electrode non-coating portions 12a on which the second electrode active materials are not applied. The second electrode non-coating portions 12a function as passages through which a current flows between the second electrode plate 12 and the outside of the second electrode plate 12. The material of the second electrode plate 12 is not limited to those disclosed by the present disclosure.

The polarity of the first electrode plate 11 and the polarity of the second electrode plate 12 may be interchanged with each other.

The separator 13 is located between the first electrode plate 11 and the second electrode plate 12 to prevent a short circuit and to allow lithium ions to move, and may be formed as a film of one of polyethylene, polypropylene, a combination thereof. However, the material of the separator 13 is not limited to those disclosed by the present disclosure.

Both ends of the electrode assembly 10 are connected to the first collecting plate 20 and the second collecting plate 30 that are respectively connected to the first electrode plate 11 and the second electrode plate 12.

The first collecting plate 20 is formed of a conductive material such as aluminum, and is in contact with the first electrode non-coating portions 11a protruding from one end of the electrode assembly 10, so that the first collecting plate 20 is electrically coupled to the first electrode plate 11. Referring to FIGS. 2 and 3, the first collecting plate 20 may include a first connection part 21, a first extension part 23, a first terminal opening 24, and a first fuse reinforcement part 25.

The first connection part 21 is installed between the upper part of the electrode assembly 10 and the lower part of the cap assembly 50, and has a plate shape.

The first extension part 23 is bent at an angle from and extends from an end of the first connection part 21, and is formed in a plate shape that is substantially in contact with the first electrode non-coating portions 11a. A corner where the first connection part 21 meets the first extension part 23 is denoted by 'C', and the first connection part 21 may be substantially perpendicular to the first extension part 23 at the corner C.

The first terminal opening 24 is located at a side of the first connection part 21, and provides the first connection part 21 with a space into which a first electrode terminal 52 of the cap assembly 50 is fitted and coupled. The first terminal opening 24 is located at a portion of the first connection part 21 which is spaced from the corner C.

The first fuse reinforcement part 25 is located on the first connection part 21 on the upper side of the electrode assembly 10 such that the first fuse reinforcement part 25 does not contact electrolyte to prevent electrolyte from being ignited by heat generated at the first fuse reinforcement part 25. In addition, the first fuse reinforcement part 25 is located in a region of the first connection part 21 adjacent to the corner C such that the first fuse reinforcement part 25 does not overlap the first electrode terminal 52 coupled to the first terminal opening 24. In one embodiment, the first fuse reinforcement part 25 includes a first fuse opening 25a and a first reinforcement protrusion 25b.

The first fuse opening 25a is located within the first connection part 21. Due to the first fuse opening 25a, a region of material of the first connection part 21 where the first fuse opening 25a is located is omitted. When a short circuit occurs in the rechargeable battery 100, a large current flows in the rechargeable battery 100, thus generating heat and melting the region of the first connection part 21 around the first fuse opening 25a so that the first fuse opening 25a functions as a fuse configured to shut off a current flow. When the rechargeable battery 100 is overcharged to generate heat and decompose electrolyte, and an inner pressure of the rechargeable battery 100 is greater than a set pressure, a short circuit may be caused by bringing a first short circuit plate 60 into contact with a second short circuit plate 61. Accordingly, a short circuit caused by overcharge melts the region of the first connection part 21 proximate the first fuse opening 25a to prevent a current flow, so that the first fuse opening 25a can stop charging or discharging of the rechargeable battery 100 before dangerous situations such as burning and explosion occur.

The first reinforcement protrusion 25b protrudes from a periphery of the first fuse opening 25a in a direction generally toward the cap assembly 50. The first reinforcement protrusion 25b strengthens the region where the first fuse opening 25a is located. Since the region of the first connection part 21 proximate the first fuse opening 25a has low resistance to external shock, if the first reinforcement protrusion 25b is removed, the region of the first connection part 21 proximate the first fuse opening 25a may be bent or fractured by external shock even when a short circuit does not occur. A distance D between an edge of the first reinforcement protrusion 25b, which is substantially perpendicular to the corner C, and an edge of the first connection part 21, which is substantially perpendicular to the corner C, may range from about 1 mm to about 5 mm. If the distance D is less than about 1 mm, the reinforcement function may be improved, but the fuse function may be relatively degraded, and if the distance D is greater than about 5 mm, the fuse function may be improved, but the reinforcement function may be relatively degraded.

The second collecting plate 30 is formed of a conductive material such as nickel, and is in contact with the second electrode non-coating portions 12a protruding from another end of the electrode assembly 10 so that the second collecting plate 30 is electrically coupled to the second electrode plate 12. The second collecting plate 30 may include a second connection part 31, a second extension part 33, a second terminal opening 34, and a second fuse reinforcement part 35 having a second fuse opening 35a and a second reinforcement protrusion 35b.

Since the second collecting plate 30 has substantially the same shape and serves substantially the same function as the first collecting plate 20 as illustrated in FIG. 3, a description thereof will be omitted. The second fuse reinforcement part 35 may be omitted from the second collecting plate 30 if the first collecting plate 20 includes the first fuse reinforcement part 25 functioning as a fuse, as in the current embodiment. In addition, the first collecting plate 20 may more easily function as a fuse since the first collecting plate 20 formed of, for example, aluminum has a lower melting point than a melting point of the second collecting plate 30 formed of nickel. However, if the first fuse reinforcement part 25 of the first collecting plate 20 does not activate or operate, the second fuse reinforcement part 35 of the second collecting plate 30 can maintain a fuse function and act as a fuse in the rechargeable battery 100. Alternatively, only the second fuse reinforcement part 35 may be provided to the second collecting plate 30 and the first fuse reinforcement part 25 may be omitted.

The case 40 is formed of conductive metal such as steel plated with aluminum, aluminum alloy, or nickel, and has an approximately hexahedron shape provided with an opening part through which the electrode assembly 10, the first collecting plate 20, and the second collecting plate 30 can be inserted and placed. Since FIG. 2 illustrates the case 40, coupled to the cap assembly 50, the opening part is not shown, but the edge of the case 40 corresponding to the cap assembly 50 is substantially open. The inner surface of the case 40 is electrically insulated from the electrode assembly 10, the first collecting plate 20, the second collecting plate 30, and the cap assembly 50. In one embodiment, the case 40 may function as a pole, e.g., a positive pole.

The cap assembly 50 is coupled to the case 40. In detail, the cap assembly 50 may include a cap plate 51, the first electrode terminal 52, the second electrode terminal 53, gaskets 54, and nuts 55. The cap assembly 50 may further include a cap 56, a vent plate 57, a connection plate 58, an upper insulating member 59, a first short circuit plate 60, a second short circuit plate 61, and lower insulating members 62.

The cap plate 51 seals an opening of the case 40, and may be formed of the same material as that of the case 40. The cap plate 51 may have the same polarity as the case 40.

The first electrode terminal 52 passes through the cap plate 51 and is electrically coupled to the first collecting plate 20. The first electrode terminal 52 may have a column shape. The outer circumferential edge of an upper portion of the column shape exposed to the upper side of the cap plate 51 is provided with a screw thread. The lower portion of the column shape located at the lower side of the cap plate 51 is provided with a flange 52a to prevent the first electrode terminal 52 from being separated from the cap plate 51. A portion of the column shape of the first electrode terminal 52 at the lower side of the flange 52a is fitted into the first terminal opening 24 of the first collecting plate 20. The first electrode terminal 52 may be electrically coupled to the cap plate 51.

The second electrode terminal 53 passes through the cap plate 51, and is electrically coupled to the second collecting plate 30. Since the second electrode terminal 53 has substantially the same shape as the first electrode terminal 52, a description thereof will be omitted. The second electrode terminal 53 is electrically insulated from the cap plate 51.

The gasket 54 is formed of an insulating material, and is located between the cap plate 51 and each of the first electrode terminal 52 and the second electrode terminal 53, to seal the space between the cap plate 51 and each of the first electrode terminal 52 and the second electrode terminal 53. The gaskets 54 prevent moisture from entering the rechargeable battery 100 and prevent electrolyte stored in the rechargeable battery 100 from leaking to the outside.

The nuts 55 are coupled along the screw threads provided respectively to the first electrode terminal 52 and the second electrode terminal 53 to respectively fix the first electrode terminal 52 and the second electrode terminal 53 to the cap plate 51.

The cap 56 seals the electrolyte injection hole 51a of the cap plate 51. The vent plate 57 is proximate the vent hole 51b of the cap plate 51, and includes a notch 57a to allow the vent plate be opened at a set pressure.

The connection plate 58 is configured such that the first electrode terminal 52 is fitted between the first electrode terminal 52 and the cap plate 51, and is in close contact with the cap plate 51 and the gasket 54 through the nut 55. The connection plate 58 electrically couples the first electrode terminal 52 to the cap plate 51.

The upper insulating member 59 is configured such that the second electrode terminal 53 is fitted between the second electrode terminal 53 and the cap plate 51, and is in close contact with the cap plate 51 and the gasket 54. The upper insulating member 59 insulates the second electrode terminal 53 and the cap plate 51.

The first short circuit plate 60 is installed over the short circuit hole 51c of the cap plate 51 between the upper insulating member 59 and the cap plate 51. The first short circuit plate 60 may be formed as a reversible plate that includes a convex part protruding downward toward the electrode assembly and an edge part fixed to the cap plate 51. When the rechargeable battery 100 is overcharged and an inner pressure is greater than a set pressure, the first short circuit plate 60 is reversed to protrude upward away from the electrode assembly. The first short circuit plate 60 has the same polarity as that of the cap plate 51.

The second short circuit plate 61 is located on an exterior of the cap plate 51 on the upper insulating member 59 and is spaced from the cap plate, and the second electrode terminal 53 is fitted into the second short circuit plate 61. The second short circuit plate 61 extends to cover the short circuit hole 51c and is electrically coupled to the second electrode terminal 53. When the rechargeable battery 100 is overcharged, and an inner pressure is greater than a set pressure, the second short circuit plate 61 contacts the first short circuit plate 60 that is reversed to protrude upward to cause, a short circuit. When the short circuit occurs, a large current flows and heat is generated which results in the first fuse reinforcement part 25 or the second fuse reinforcement part 35 functioning as a fuse, thereby improving the stability of the rechargeable battery 100.

The lower insulating member 62 is located between the cap plate 51 and each of the first collecting plate 20 and the second collecting plate 30 to prevent an unnecessary short circuit.

As described above, the rechargeable battery 100 includes the first fuse reinforcement part 25 having the first fuse opening 25a, or the second fuse reinforcement part 35 having the second fuse opening 35a, to shut off a current flow when a short circuit is caused by a state such as overcharging, thus improving the stability of the battery.

In addition, the rechargeable battery 100 includes the first fuse reinforcement part 25 having the first reinforcement protrusion 25b, or the second fuse reinforcement part 35 having the second reinforcement protrusion 35b, to strengthen the region where the first fuse opening 25a is located, or the region where the second fuse opening 35a is located. Accordingly, the rechargeable battery 100 prevents the region where the first fuse opening 25a is located, or the region where the second fuse opening 35a is located from being bent or fractured by external shock before a short circuit occurs, thus preventing the loss of the fuse function.

Hereinafter, a rechargeable battery will now be described according to another embodiment.

Figure 6:
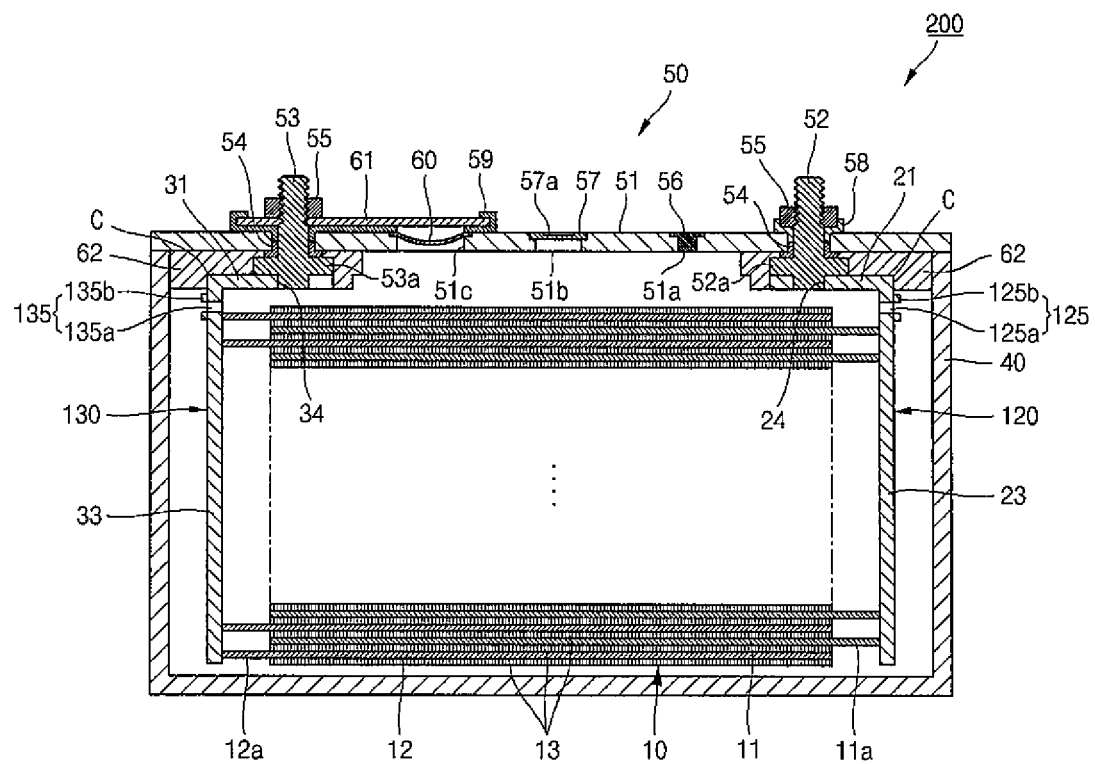
FIG. 6 is a cross-sectional view illustrating a secondary battery according to another embodiment.
Figure 7:
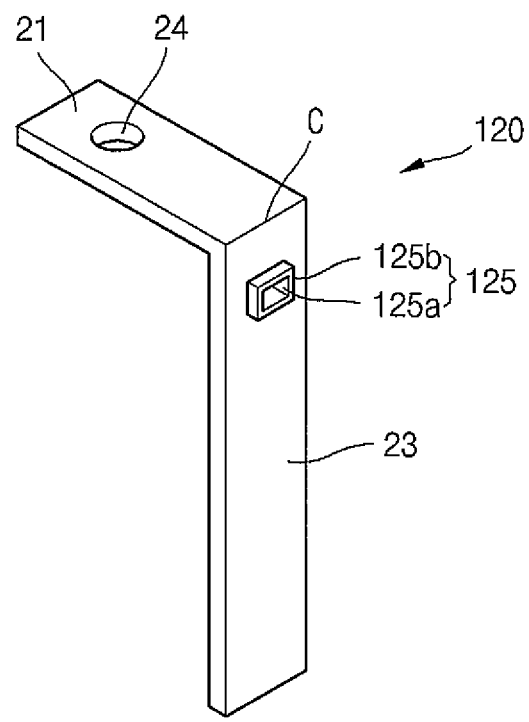
FIG. 7 is a perspective view illustrating a first collecting plate of FIG. 6.
Figure 8:
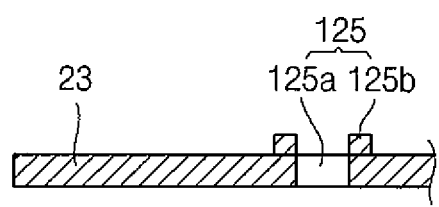
FIG. 8 is a partial cross-sectional view illustrating a portion of the first collecting plate of FIG. 7.

FIG. 6 is a cross-sectional view illustrating the secondary battery according to the current embodiment. FIG. 7 is a perspective view illustrating a first collecting plate of FIG. 6. FIG. 8 is a partial cross-sectional view illustrating a portion of the first collecting plate of FIG. 7.

The rechargeable battery 200 according to the current embodiment is substantially the same in configuration and function as the rechargeable battery 100 illustrated in FIG. 2 except for the position of a first fuse reinforcement part 125 of a first collecting plate 120 and the position of a second fuse reinforcement part 135 of a second collecting plate 130. Accordingly, descriptions of the same configurations of the rechargeable battery 200 as those of the previous embodiment will be omitted, and the first fuse reinforcement part 125 of the first collecting plate 120 and the second fuse reinforcement part 135 of the second collecting plate 130 will now be primarily described.

Referring to FIG. 6 through 8, the rechargeable battery 200 includes the electrode assembly 10, the first collecting plate 120, the second collecting plate 130, the case 40, and the cap assembly 50.

Referring to FIGS. 6 and 7, the first collecting plate 120 may include the first connection part 21, the first extension part 23, the first terminal opening 24, and the first fuse reinforcement part 125.

The first fuse reinforcement part 125 is similar to the first fuse reinforcement part 25 illustrated in FIGS. 2 and 3, and is substantially the same in function. However, the first fuse reinforcement part 125 is located at an upper region of the first extension part 23 in minimum contact with electrolyte, that is, at a region adjacent to the corner C. In one embodiment, the first fuse reinforcement part 125 includes a first fuse opening 125a passing through the first extension part 23, and a first reinforcement protrusion 125b protruding from a peripheral of the first fuse opening 125a to the case 40.

The second collecting plate 120 may include the second connection part 31, the second extension part 33, the second terminal opening 34, and the second fuse reinforcement part 135. The second fuse reinforcement part 135 includes a second fuse opening 135a and a second reinforcement protrusion 135b, and is the same in shape and function as the first fuse reinforcement part 125.

As described above, the rechargeable battery 200 includes the first and second fuse reinforcement parts 125 and 135 having the fuse and reinforcement functions, which are located respectively at the first extension part 23 of the first collecting plate 120 and the second extension part 33 of the second collecting plate 130, thus efficiently preventing interference of the first and second fuse reinforcement parts 25 and 35 respectively with the first electrode terminal 52 and the second electrode terminal 53.

Hereinafter, a rechargeable battery will now be described according to another embodiment.

Figure 9:
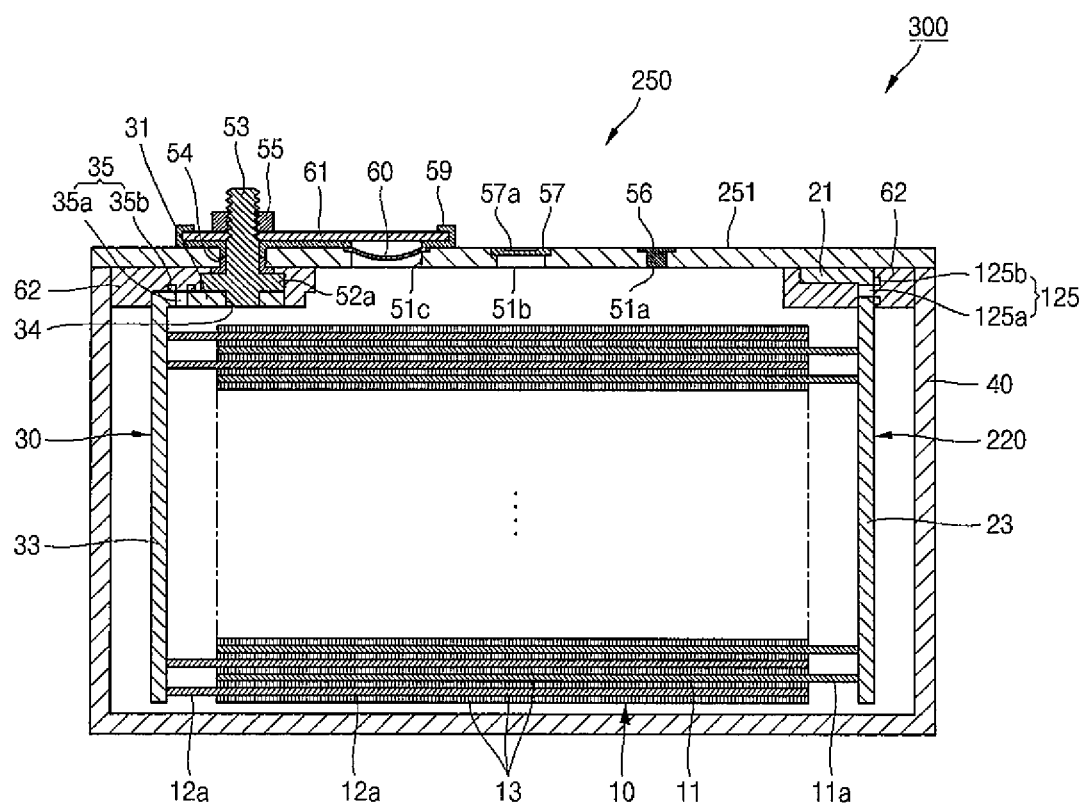
FIG. 9 is a cross-sectional view illustrating a secondary battery according to another embodiment.

FIG. 9 is a cross-sectional view illustrating the secondary battery according to the current embodiment.

A rechargeable battery 300 according to the current embodiment is the same in configurations and functions as the rechargeable battery 100 illustrated in FIG. 2 except for a first collecting plate 220 and a cap assembly 250. Accordingly, descriptions of the same configurations of the rechargeable battery 300 as those of the previous embodiment will be omitted, and the first collecting plate 220 and the cap assembly 250 will now be primarily described.

Referring to FIG. 9, the rechargeable battery 300 includes the electrode assembly 10, the first collecting plate 220, the second collecting plate 30, the case 40, and the cap assembly 250.

The first collecting plate 220 includes the first connection part 21, the first extension part 23, and the first fuse reinforcement part 125, like the first collecting plate 120 illustrated in FIG. 7. However, the first collecting plate 220 is different from the first collecting plate 120 in that the first connection part 21 is in direct contact with a cap plate 251 of the cap assembly 250. In addition, the first terminal opening 24 illustrated in FIG. 7 is omitted from the first collecting plate 220. The first connection part 21 of the first collecting plate 220 is in contact with the cap plate 251 and they have the same polarity. The first fuse reinforcement part 125 is located on the first extension part 23 to facilitate contact between the first connection part 21 and the cap plate 251.

The cap assembly 250 is similar to the cap assembly 50 illustrated in FIG. 2 in that the cap assembly 250 includes the second electrode terminal 53, the gasket 54 and the nut 55 that are located at the second electrode terminal 53, the cap 56, the vent plate 57, the upper insulating member 59, the first short circuit plate 60, the second short circuit plate 61, and the lower insulating members 62. However, the first electrode terminal 52 as shown in FIG. 2, the gasket 54, the nut 55, and the connection plate 58 are omitted from the cap assembly 250. Thus, the cap plate 251 is different from the cap plate 51 of FIG. 2.

As described above, according to the current embodiment, the first electrode terminal 52 of FIG. 2 is omitted from the rechargeable battery 300, and the first collecting plate 220 including the first fuse reinforcement part 125 is in contact with the cap plate 251. Thus, configurations needed for the first electrode terminal 52 are removed to simplify a manufacturing process and to reduce manufacturing costs, and simultaneously, to reduce electric resistance between the electrode assembly 10 and an external electronic device.

The rechargeable battery according to the current embodiments includes the first fuse reinforcement part having the first fuse opening, or the second fuse reinforcement part having the second fuse opening, to shut off a current flow when a short circuit is caused by a state such as overcharge, thus improving the stability.

In addition, the rechargeable battery according to the current embodiments includes the first fuse reinforcement part having the first reinforcement protrusion, or the second fuse reinforcement part having the second reinforcement protrusion, to strengthen the region where the first fuse opening is located, or the region where the second fuse opening is located. Accordingly, the rechargeable battery prevents the region where the first fuse opening is located, or the region where the second fuse opening is located from being bent or fractured by external shock before a short circuit occurs, thus preventing the loss of the fuse function.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A rechargeable battery comprising:
an electrode assembly comprising a first electrode plate, a second electrode plate, and a separator between the first electrode plate and the second electrode plate;

a first collecting plate electrically coupled to the first electrode plate, the first collecting plate comprising a fuse part having a fuse opening and a fuse reinforcement part having a reinforcement protrusion, the reinforcement protrusion surrounding a periphery of the fuse opening and protruding from the periphery in a direction away from the electrode assembly;

a case housing the electrode assembly and the first collecting plate; and a cap assembly coupled to the case and comprising a cap plate.

2. The rechargeable battery as claimed in claim 1, wherein the reinforcement protrusion protrudes towards the cap assembly or towards the case.

3. The rechargeable battery as claimed in claim 1, wherein the first collecting plate comprises:
   a first connection part located between the electrode assembly and the cap assembly; and
   a first extension part extending at an angle from the first connection part and contacting a non-coating portion of the first electrode plate, wherein the fuse reinforcement part is on the first connection part or on the first extension part.

4. The rechargeable battery as claimed in claim 3, wherein the fuse reinforcement part is located on the first connection part adjacent an intersection of the first connection part and the first extension part.

5. The rechargeable battery as claimed in claim 3, wherein the fuse reinforcement part is located on the first extension part adjacent an intersection of the first connection part and the first extension part.

6. The rechargeable battery as claimed in claim 3, wherein a distance between an edge of the reinforcement protrusion and an edge of one of the first connection part and the first extension part is between about 1 mm and about 5 mm.

7. The rechargeable battery as claimed in claim 1, further comprising a second collecting plate electrically coupled to the second electrode plate, the second collecting plate comprising a fuse part having a fuse opening and a fuse reinforcement part having a reinforcement protrusion, the reinforcement protrusion protruding from a periphery of the fuse opening.

8. The rechargeable battery as claimed in claim 7, wherein the reinforcement protrusion of the second collecting plate protrudes towards the cap assembly or towards the case.

9. The rechargeable battery as claimed in claim 7, wherein the cap assembly comprises:
   a first electrode terminal passing through the cap plate and contacting the first collecting plate; and
   a second electrode terminal passing through the cap plate and contacting the second collecting plate.

10. The rechargeable battery as claimed in claim 9, wherein the reinforcement protrusion of the first collecting plate and the reinforcement protrusion of the second collecting plate protrude toward the cap assembly.

11. The rechargeable battery as claimed in claim 9, wherein the reinforcement protrusion of the first collecting plate and the reinforcement protrusion of the second collecting plate protrude toward the case.

12. The rechargeable battery as claimed in claim 7, wherein the first collecting plate contacts the cap plate, and the cap assembly comprises an electrode terminal passing through the cap plate and contacting the second collecting plate.

13. The rechargeable battery as claimed in claim 12, wherein the reinforcement protrusion of the first collecting plate protrudes toward the case, and wherein the reinforcement protrusion of the second collecting plate protrudes toward the cap assembly.

14. The rechargeable battery as claimed in claim 7, wherein the cap assembly comprises:
   a first short circuit plate accommodated in a short circuit opening on the cap plate, wherein the first short circuit plate is movable between a convex configuration and a concave configuration; and
   a second short circuit plate electrically coupled to the second collecting plate on an exterior of the case, the second short circuit plate spaced from the cap plate and covering the short circuit opening.

15. The rechargeable battery as claimed in claim 7, wherein the second collecting plate comprises:
   a second connection part between the electrode assembly and the cap assembly; and
   a second extension part bent and extending from the second connection part and contacting a second electrode non-coating portion of the second electrode plate,
   wherein the fuse reinforcement part of the second collecting plate is on the second connection part or the second extension part.

16. The rechargeable battery as claimed in claim 15, wherein the fuse reinforcement part of the second collecting plate is on the second connection part proximate an intersection of the second connection part and the second extension part.

17. The rechargeable battery as claimed in claim 15, wherein the fuse reinforcement part of the second collecting plate is on the second extension part proximate an intersection of the second connection part and the second extension part.

18. The rechargeable battery as claimed in claim 15, wherein a distance between an edge of the reinforcement protrusion of the second collecting plate and an edge of one of the second connection part and the second extension part is between about 1 mm to about 5 mm.

19. The rechargeable battery as claimed in claim 1, wherein the reinforcement protrusion is spaced from the electrode assembly.

* * * * *